United States Patent [19]
Hayes et al.

[11] Patent Number: 5,581,286
[45] Date of Patent: Dec. 3, 1996

[54] MULTI-CHANNEL ARRAY ACTUATION SYSTEM FOR AN INK JET PRINTHEAD

[75] Inventors: Donald J. Hayes, Plano; David B. Wallace, Dallas, both of Tex.

[73] Assignee: Compaq Computer Corporation, Houston, Tex.

[21] Appl. No.: 371,888

[22] Filed: Jan. 12, 1995

Related U.S. Application Data

[63] Continuation of Ser. No. 59,948, May 5, 1993, abandoned, which is a continuation-in-part of Ser. No. 815,396, Dec. 31, 1991, Pat. No. 5,208,980.

[51] Int. Cl.$^6$ .............................. B41J 2/045; B41J 2/205
[52] U.S. Cl. ................................ 347/71; 347/47; 347/15
[58] Field of Search .......................... 347/68, 69, 70, 347/71, 47, 15

[56] References Cited

U.S. PATENT DOCUMENTS

| | | | |
|---|---|---|---|
| 4,032,929 | 6/1977 | Fischbeck | 347/40 X |
| 4,326,205 | 4/1982 | Fischbeck et al. | 347/48 |
| 4,364,067 | 12/1982 | Koto | 347/70 |
| 4,435,721 | 3/1984 | Tsuzori | 347/68 |
| 4,455,560 | 6/1984 | Louzil | 347/47 X |
| 4,842,493 | 6/1989 | Nilsson | 347/68 X |
| 5,208,980 | 5/1993 | Hayes | 347/47 X |
| 5,227,813 | 7/1993 | Pies | 347/71 |

FOREIGN PATENT DOCUMENTS

| | | | |
|---|---|---|---|
| 3126372 | 9/1982 | Germany | B41J 3/04 |
| 54-131934 | 10/1979 | Japan | B41J 3/04 |
| 55-003916 | 1/1980 | Japan | B41J 3/04 |
| 55-079172 | 6/1980 | Japan | B41J 3/04 |
| 61-114854 | 6/1986 | Japan | B41J 3/04 |
| PCT/GB91/00720 | 11/1991 | WIPO | B41J 2/16 |
| PCT/US92/10952 | 7/1993 | WIPO | B41J 2/16 G |

Primary Examiner—Joseph W. Hartary
Attorney, Agent, or Firm—Vinson & Elkins L.L.P.

[57] ABSTRACT

A spot size modulatable, drop-on-demand type ink jet printhead and associated methods for ejecting volume modulatable droplets of ink therefrom. The ink jet printhead includes a main body portion having first and second ink carrying channels longitudinally extending therethrough and a cover plate fixedly mounted thereto. Formed in the cover plate is a tapered orifice which extends from first and second openings along a back side surface to a third opening along a front side surface thereof. The cover plate is mounted to the main body portion such that the first opening is in communication with the first ink carrying channel and the second opening is in communication with the second ink carrying channel. The ink jet printhead further includes first and second actuators coupled with the first and second ink carrying channels, respectively. Volume modulatable droplets of ink may be ejected from the ink jet printhead by simultaneously applying a voltage pulse having a selected magnitude to the first ink carrying channel and a voltage pulse having a magnitude ranging between zero and the selected magnitude to the second ink carrying channel. Alternately, volume modulatable droplets of ink may be ejected from the ink jet printhead by sequentially applying a voltage pulse having a selected time duration to the first ink carrying channel and a voltage pulse having a time duration ranging between zero and the selected time duration to the second ink carrying channel.

14 Claims, 3 Drawing Sheets

MULTI-CHANNEL ARRAY ACTUATION SYSTEM FOR AN INK JET PRINTHEAD

CROSS REFERENCE TO RELATED APPLICATION

This is a continuation of application Ser. No. 08/059,948, filed May 5, 1993, now abandoned, which is a Continuation-in-part of U.S. patent application Ser. No. 07/815,396, filed Dec. 31, 1991, now U.S. Pat. No. 5,208,980, entitled "Method of Forming Tapered Orifice Arrays in Fully Assembled Ink Jet Printheads", assigned to the assignee of the present invention, and hereby incorporated by reference as if reproduced in its entirety.

BACKGROUND OF THE INVENTION

1. Field of the Invention

The present invention generally relates to ink jet printhead apparatus and, more particularly, to an ink jet printhead having a multi-channel array actuation system suitable for producing spot size modulatable droplets.

2. Description of Related Art

In the parent of the present application, a method of forming tapered orifice arrays in fully assembled ink jet printheads was disclosed. In accordance with the teachings of that invention, an ink jet printhead body having a front side and a plurality of ink carrying channels axially extending therethrough is first provided. A cover plate to be mounted onto the front side of the ink jet printhead body is selected based upon the desired size of the orifices at the inner side of the cover plate and then mounted onto the front side of the ink jet printhead body to cover the ink carrying channels. For each orifice to be formed as part of the orifice array, first and second cover plate ablating light beams are generated and directed, at first and second angles, respectively, at specified locations on the front side of the cover plate which correspond to selected ones of the ink-carrying channels to form ink carrying channel communicating orifices extending through the cover plate, tapering outwardly therethrough and in respective communication with the selected ones of the ink carrying channels. In one particular aspect of that invention, the outwardly tapered orifice is formed to have a first opening at the front side of the cover plate and first and second openings in communication with the ink carrying channel at the back side of the cover plate.

FIG. 1 illustrates an enlarged, partial cross-sectional view of a cover plate 14' having a back side surface 14a' to be mounted to a main body portion of an ink jet printhead and a front side surface 14b'. Extending through the cover plate 14' is a tapered orifice 16 which may be formed using the techniques set forth in U.S. patent application Ser. No. 07/815,296 filed Dec. 31, 1991 and previously incorporated by reference. The tapered orifice 16 has a pair of inner apertures 18c and 18d and a single outer aperture 20c, all of which have approximately the same diameter.

It has now been discovered that the cover plate 14' is particularly useful in the construction of a spot size modulatable ink jet printhead having a multi-channel array actuation system. As is well known in the art, ink jet printing devices use the ejection of tiny droplets of ink to produce an image. To do so, a volumetric change in fluid contained in internal channels of the printhead is induced by the application of a voltage pulse to a piezoelectric material which is directly or indirectly coupled to the fluid. This volumetric change causes pressure/velocity transients to occur in the fluid and these are directed so as to force a small, fixed quantity of ink, in droplet form, outwardly through the discharge orifice at a fixed velocity. Alternately, a voltage may be applied to a resistive element disposed in the fluid, thereby heating the fluid contained in the internal channels until expansion of the heated ink causes the ejection of a droplet of ink therefrom. However ejected from the ink jet printhead, the droplet strikes the paper at a specified location related to the image being produced and forms an ink "spot" having a diameter directly related to the volume of the ejected droplet.

As should be readily appreciated by one skilled in the art, the modulation of spots formed by an ink jet printhead may be used to produce gray scale images. In the past, attempts to produce a gray scale image using an ink jet printhead were directed to the modulation of spot density. To do so, the ink jet printhead creates various shades of gray by varying the density of the fixed size ink spots. Darker shades are created by increasing spot density and lighter shades are created by reducing spot density. Producing a gray scale image in this manner, however, reduces the spacial resolution of the printer, thereby limiting its ability to produce finely detailed images. Furthermore, the more levels added to the gray scale, the greater the resultant degradation of the printer's spacial resolution. A second proposed solution has been to direct multiple droplets at a single location on the sheet of paper to form variably sized spots. While such a method can produce the variably sized spots necessary to produce a gray scale image, such a technique tends to reduce the operating speed of the printer to an unacceptably low level. Furthermore, this technique also tended to produce elongated or elliptical dot patterns.

It can be readily seen from the foregoing that it would be desirable to provide an improved drop-on-demand type ink jet printhead configured such that the size of ink spots produced thereby is readily modulatable to produce a gray scale. It is, therefore, an object of the present invention to provide such an improved drop-on-demand type ink jet printhead utilizing a tapered orifice array in which each orifice has a single opening on a front side surface thereof and a pair of openings on a back side surface thereof in combination with a multi-channel array actuation system.

SUMMARY OF THE INVENTION

In one embodiment, the present invention is of a spot size modulatable, drop-on-demand type ink jet printhead which includes a main body portion having first and second ink carrying channels longitudinally extending therethrough. A back side surface of a cover plate is fixedly mounted to a front side surface of the main body portion. Formed in the cover plate is a tapered orifice which extends from first and second openings along the back side surface to a third opening along a front side surface thereof. The cover plate is mounted to the main body portion such that the first opening is in communication with the first ink carrying channel and the second opening is in communication with the second ink carrying channel. The ink jet printhead further includes first and second actuators coupled with the first and second ink carrying channels, respectively, and means for selectively activating the first and second actuators to impart a pressure pulse to the ink carrying channel coupled thereto.

In alternate aspects of this embodiment of the invention, the first and second ink carrying channels may be respectively formed above and below, or to the left and right of, the third opening along the front side surface of the cover plate. In further alternate aspects of this embodiment of the invention, the first and second actuators may be thermal or piezoelectric actuators. If of the piezoelectric type, the actuators may be remotely located within the ink carrying channels or may longitudinally extend along a wall, such as a sidewall, partially defining the ink carrying channels. Finally, in one particular aspect of the invention, the piezoelectric actuators form an upper sidewall actuation portion of a sidewall for each ink carrying channel. In this aspect, the common sidewall between the first and second ink carrying channels is inactive.

In another embodiment, the present invention is of a method for ejecting volume modulatable droplets of ink from an orifice in a cover plate having first and second openings in communication with first and second ink carrying channels which longitudinally extend through a main body portion of a drop-on-demand type ink jet printhead. A first pressure pulse capable of ejecting a droplet of ink from the orifice is generated in the first ink carrying channel. Simultaneously therewith, a second pressure pulse is generated in the second ink carrying channel to cause the ejection of a volume modulatable droplet of ink from a third opening in the orifice. In one aspect of this embodiment of the invention, the second pressure pulse is generated to have a magnitude ranging between zero and the magnitude of the first pressure pulse. In this manner, a droplet of ink having a volume modulatable between a first, minimum volume and a second, maximum volume is ejected from the third opening in the orifice.

In yet another embodiment, the present invention is of a method for ejecting volume modulatable droplets of ink from an orifice in a cover plate having first and second openings in communication with first and second ink carrying channels which longitudinally extend through a main body portion of a drop-on-demand type ink jet printhead. A first pressure pulse capable of ejecting a droplet of ink from the orifice is generated in the first ink carrying channel. Sequentially thereafter, a second pressure pulse is generated in the second ink carrying channel to cause the ejection of a volume modulatable droplet of ink from a third opening in the orifice. In one aspect of this embodiment of the invention, the second pressure pulse is generated to have a time duration ranging between zero and the time duration of the first pressure pulse. In this manner, a droplet of ink having a volume modulatable between a first, minimum volume and a second, maximum volume is ejected from the third opening in the orifice.

BRIEF DESCRIPTION OF THE DRAWING

The invention will be more clearly understood and its numerous objects and advantages will become apparent to those skilled in the art by reference to the accompanying drawing in which.

DETAILED DESCRIPTION

Figure 2:
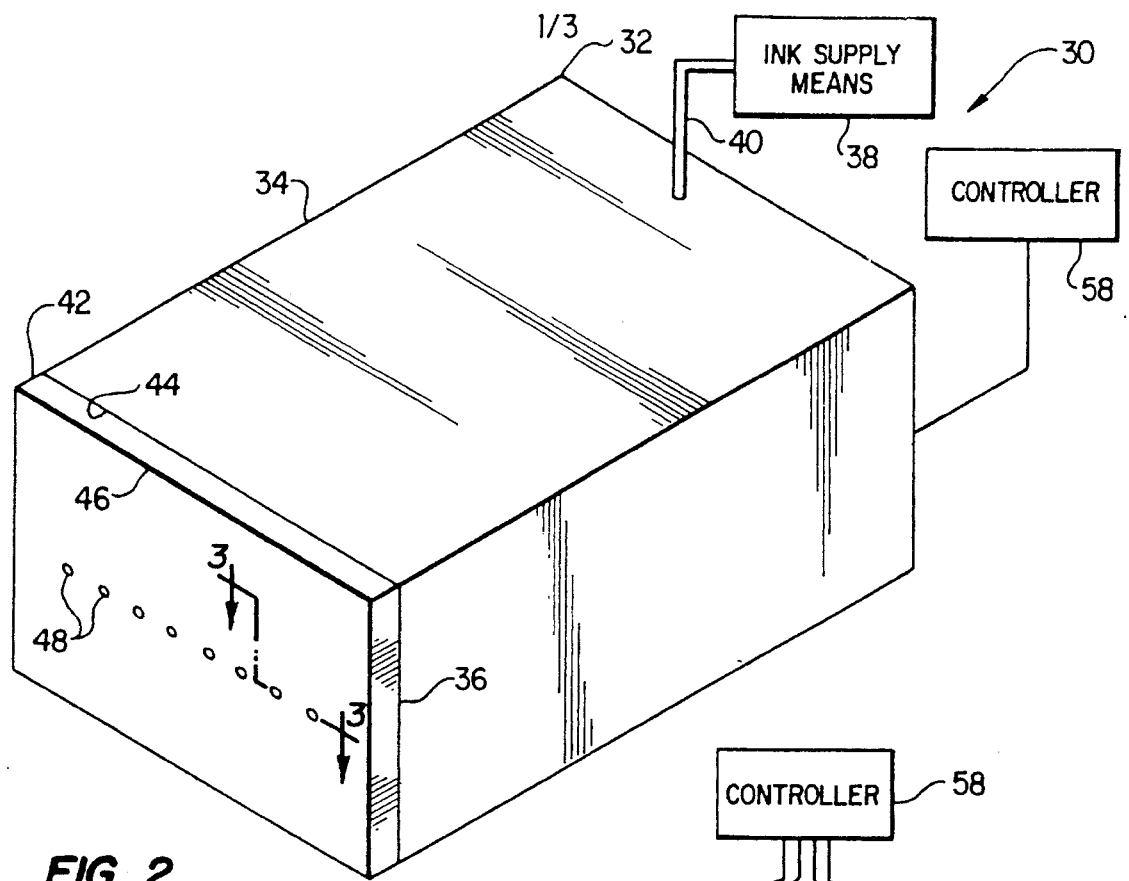
FIG. 2 is a perspective view of an ink jet printhead having a multi-channel array actuation system configured for producing spot size modulatable droplets of ink and constructed in accordance with the teachings of the present invention.

Referring now to the drawing where like reference numerals designate the same or similar elements throughout the several views, in FIG. 2, an ink jet printer 30 incorporating therein a specially designed spot size modulatable drop-on-demand type ink jet printhead 32 which incorporates a multi-channel array actuation system and is constructed in accordance with the teachings of the present invention may now be seen. The ink jet printhead 32 includes a main body portion 34 having a plurality of ink carrying channels (not visible in FIG. 2) longitudinally extending therethrough. Typically, each of the ink carrying channels extend from a first end located within the main body portion 34 and terminate at an opening along a front side surface 36 of the main body portion 34. Preferably, the ink carrying channels should be generally parallel to each other along their entire length. It is noted, however, that in one embodiment of the invention not illustrated in the drawing, the ink carrying channels may be of the type which are supplied with ink from a remotely located chamber and the ink carrying channels are parallel with each other only along a front end portion of the ink jet printhead.

Ink is supplied to the ink-carrying channels from an ink supply means 38 via an external conduit 40. Many methods for supplying ink from the ink supply means to the ink-carrying channels are known in the art and, therefore, need not be described in greater detail here. For example, for the ink jet printhead 32, the external conduit 40 delivers the ink to a vertically orientated internal conduit (not shown) which, in turn, supplies the ink to a manifold (also not shown) which extends within the interior of the ink jet printhead 32 in a direction generally normal to the longitudinally extending ink carrying channels. As the manifold is in communication with each of the generally parallel longitudinally extending ink carrying channels, ink may be drawn into the ink carrying channels from the manifold.

Continuing to refer to FIG. 2, the ink jet printhead 32 further includes a cover plate 42 having a back side surface 44 fixedly secured to the front side surface 36 of the main body portion 34, a front side surface 46 and a plurality of tapered orifices 48 extending therethrough. Preferably, the cover plate 42 should be formed of polyamide or another suitable material.

Figure 3:
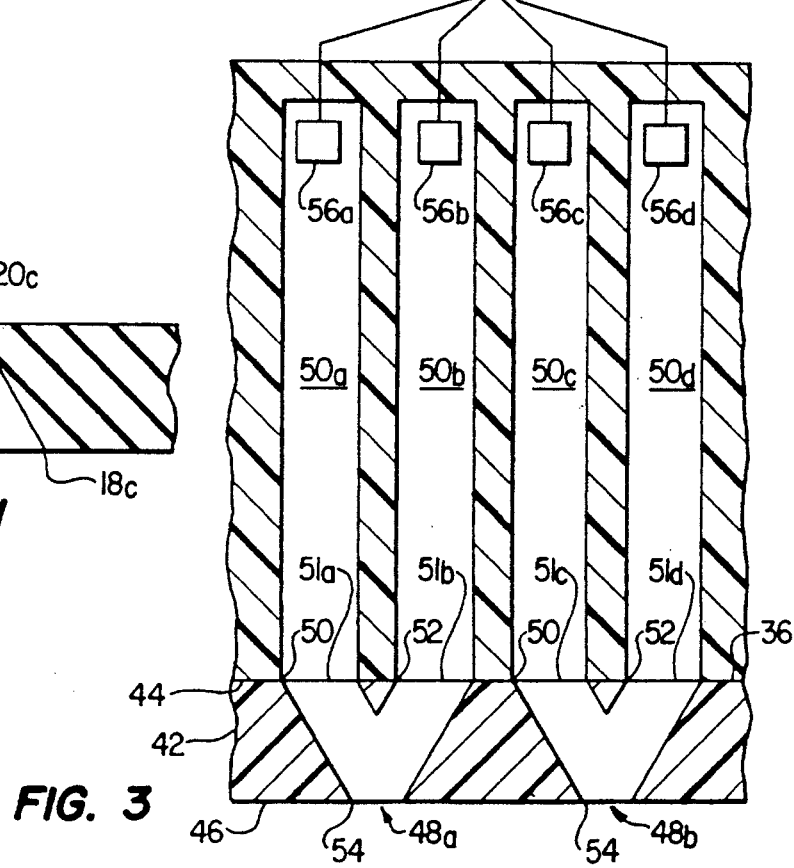
FIG. 3 is an enlarged scale, partial cross-sectional view of the ink jet printhead of FIG. 2 taken along line 3—3 thereof and illustrating a plurality of actuatable ink carrying channels, each pair of which are associated with a common ink ejection orifice and which are suitable for ejecting spot size modulatable droplets of ink therefrom.

Referring next to FIG. 3, the tapered orifices 48 formed in the cover plate 42 and their positioning relative to ink carrying channels formed in the main body portion 34 of the ink jet printhead 32 will now be described in greater detail. As may now be seen, each orifice 48a, 48b has a pair has a pair of inner openings 50 and 52 and a single outer opening 54, all of which have approximately the same diameter. The back side surface 44 of the cover plate 42 is aligned, mated and bonded with the front side surface 36 of the main body portion 34 such that each tapered orifice 48a, 48b is in communication with a pair of adjacent ink carrying channels 50a and 50b, 50c and 50d, respectively. More specifically, the back side surface 44 is mounted to the front side surface 36 of the cover plate 42, for example, using a layer of adhesive material (not shown) such that opening 51a in the ink carrying channel 50a is in communication with the opening 50 of the orifice 48a, opening 51b in the ink carrying channel 50b is in communication with the opening 52 of the orifice 48a, opening 51c in the ink carrying channel 50c is in communication with the opening 50 of the orifice 48b and opening 51d in the ink carrying channel 50d is in communication with the opening 52 of the orifice 48b.

Regarding the taper of the orifices 48a and 48b, the orifices 48a and 48b may be considered to be "inwardly" tapered from the back side surface 44 of the cover plate 42 where the openings 50, 52 of the orifices 48a, 48b communicate with the ink carrying channels 50a, 50b, 50c and 50d, respectively, to the front side surface 46 of the cover plate 42 from where the ink droplets are ejected from the openings 54. Alternately, the orifices 48 may be considered to be "outwardly" tapered from the front side surface 46 of the cover plate 42 to the back side surface 44 of the cover plate 42. Preferably, each tapered orifice 48a, 48b should be formed such that the openings 50, 52 have a width either equal to or slightly less that the width of the ink carrying channels 50a, 50b, 50c, 50d, and are positioned such that openings 50, 52 are positioned at the general center of the end of the corresponding channels 50a, 50b, 50c, 50d. Although it would be possible to precisely position and mount the rear side surface 44 of the cover plate 42 having the orifices 48 formed therein to the front side surface 36 of the main body portion 34 such that openings 51a, 51b, 51c and 51d communicate with openings 50, 52 of orifices 48a, 48b, respectively, it is preferred that an orificeless cover plate is mounted to the main body portion 34 and the orifices 48 formed therein in accordance with the techniques disclosed in copending U.S. patent application Ser. No. 07/815,396. In this manner, ink ejection nozzles are provided for the ink carrying channels 50a, 50b, 50c, 50d. By positioning the orifices 48a, 48b relative to the ink carrying channels 50a, 50b, 50c, 50d in this manner, and in accordance with an actuation technique more fully described below, the ink jet printhead 32 is capable of producing volume modulatable droplets of ink.

As may now be further seen in FIG. 3, the main body portion 34 is constructed of an inactive material and has a series of longitudinally extending, generally parallel ink carrying channels 50a, 50b, 50c, 50d formed therein. Acoustically coupled with each ink carrying channel 50a, 50b, 50c, 50d is a corresponding actuator 56a, 56b, 56c, 56d. To produce a pressure pulse in a selected channel 50a–d, a controller 58 issues a signal to the actuator 56a–d positioned in the selected ink carrying channel 50a–d. In response thereto, the selected actuator 56a–d will generate a pressure pulse which, as will be more fully described below, may cause the ejection of a volume modulatable droplet of ink from the selected channel 50a–d.

In alternate embodiments of the invention, it is contemplated that the actuators 56a, 56b, 56c, 56d may either be a piezoelectric actuator which distorts in response to the application of a voltage thereto to produce a pressure wave capable of ejecting a droplet of ink from the channel or a thermal actuator which heats the ink contained in the channel in response to the application of a voltage thereto until expansion of the heated ink causes the ejection of a droplet of ink from the channel. It is further contemplated that, in various embodiments of the invention, the piezoelectric actuator may either be a shear mode or a normal mode piezoelectric actuator. It is still further contemplated that the piezoelectric actuators 56a–d may either be remotely positioned relative to the front side surface 36 of the ink jet printhead 32, as illustrated in FIG. 3, or, in an embodiment of the invention not shown in the drawing, may longitudinally extend along the roof of the ink carrying channels 50a–d. Finally, in a preferred embodiment of the invention more fully described below with respect to FIGS. 5–7, the piezoelectric actuators 56a–d longitudinally extend along the sidewalls of the channel 50a–d. Accordingly, in various embodiments of the invention, it is expected that the ink jet printhead 32 may be configured such that the main body portion 34 of the ink jet printhead 32 is formed of a single piece of material, either active or inactive, or formed of any number of components, again, either active or inactive, bonded together to form the main body portion 34.

Continuing to refer to FIG. 3, the capability of the ink jet printhead 32 to modulate the volume of droplets ejected thereby will now be described in greater detail. As previously stated, the controller 58 is configured to selectively activate the piezoelectric actuator 56a or 56b acoustically coupled to the ink carrying channels 50a, 50b. To eject a droplet of ink from the ink carrying channel 50a or 50b, the controller 58 should apply a sufficiently high voltage, for example, 20 volts, to the piezoelectric actuator 56a or 56b coupled to the selected ink carrying channel 50a or 50b. In turn, the selected piezoelectric actuator 56a or 56b produces a pressure pulse in the corresponding ink carrying channel 50a or 50b capable of forcing a small quantity of ink, in droplet form, out of the opening 51a or 51b in the front side surface 36 of the main body portion 34, through the orifice 48a in communication with the selected channel 50a or 50b, where it is ejected from the opening 54 in the front side surface 46 of the cover plate 42. Below that voltage, the produced pressure pulse would have insufficient strength to eject a droplet of ink from the selected ink carrying channel 50a or 50b. Accordingly, when the aforementioned sufficiently high voltage is applied to a single piezoelectric actuator 56a or 56b, a minimum volume droplet is ejected therefrom.

Thus, for a given pair of ink carrying channels 50a, 50b in communication with the orifice 48a, a droplet of ink having a desired volume may be ejected from the orifice 48a by applying a selected voltage across the piezoelectric actuator 56a, thereby generating a pressure pulse in the ink carrying channel 50a having sufficient strength to eject a droplet of ink having the desired volume. Alternately, a droplet of ink having the specified volume may be ejected from the orifice 48a by applying the same voltage across the piezoelectric actuator 56b to generate an equally strong, ink ejecting pressure pulse in the ink carrying channel 50b. If, however, pressure pulses were simultaneously produced in the ink carrying channels 50a and 50b by simultaneously applying the selected voltage across both the piezoelectric actuator 56a and the piezoelectric actuator 56b, the generated pressure waves would arrive at the orifice 48a simultaneously and an increased volume droplet of ink would be ejected from the orifice 48. Accordingly, when the selected voltage is simultaneously applied to the piezoelectric actuator 56a or 56b, a maximum volume droplet is produced for the selected voltage.

It is further contemplated that, between these extremes of minimum and maximum droplet volume for a selected voltage, significant modulation of the volume of a droplet of ink ejected by the ink jet printhead 32 may be further achieved. More specifically, by varying the voltage applied to the piezoelectric actuator 56b, the volume of ink contained in a droplet ejected from the orifice 48a is modulatable between the aforementioned minimum and maximum volumes. To do so, the selected voltage is applied to the piezoelectric actuator 56a while a voltage between zero and the selected voltage is simultaneously applied to the piezoelectric actuator 56b. The volume of ink contained in a droplet ejected thereby will be between the aforementioned minimum and maximum volumes. Of course, further modulation of the volume is achievable by raising the voltage applied to one or both of the piezoelectric actuators 56a, 56b above the selected voltage.

For the previously described example of a modulatable volume droplet to be ejected from the ink jet printhead 32, the pressure pulses produced in the ink carrying channels 50a and 50b were timed to arrive at the openings 51a, 51b along the front side surface 36 of the ink jet printhead 34 at the same time. As a result, a larger pressure pulse capable of ejecting a greater volume of ink was produced. It is entirely possible, however, that while the droplet produced in this manner will have a greater volume, the velocity of the droplet will have been inadvertently increased as well. If, however, the actuators 56a and 56b were fired in succession so that the pressure wave travelling through the ink carrying channel 50b arrived at the orifice 48a at the tail end of the pressure wave travelling through ink carrying channel 50a, another maximum volume droplet, this time travelling at the same velocity as the minimum volume droplet will be produced.

For example, assume that the minimum period for which a selected voltage must be applied to the piezoelectric actuator 56a or 56b to produce a pressure wave capable of ejecting a droplet of ink from the ink jet printhead 32 is 20 μseconds. In this embodiment of the invention, after the selected voltage is applied to the piezoelectric actuator 56a for 20 μseconds, the same voltage is then applied to the piezoelectric actuator 56b, again for 20 μseconds, thereby producing a pressure wave in the ink carrying channel 50b. The respective pressure waves will arrive sequentially at the orifice 48a. Accordingly, the resultant ink ejecting pressure pulse will be twice as long, but of equal magnitude, as the pressure pulse produced by one of the ink carrying channels 50a, 50b alone. In this manner, a maximum volume droplet is again ejected from the ink jet printhead 34. This time, however, the likelihood that the velocity of the maximum volume droplet relative to the velocity of the minimum volume droplet will be increased is dramatically reduced.

As before, the volume of the droplets produced in this manner may be readily modulatable between the minimum and maximum volumes. More specifically, by varying the time period during which the selected voltage is applied to the piezoelectric actuator 56b, the volume of ink contained in a droplet ejected thereby is modulatable between the aforementioned minimum and maximum volumes. To do so, the selected voltage is applied to the piezoelectric actuator 56a for 20 μseconds and, at the expiration of this time period, the selected voltage is applied to the piezoelectric actuator 56b for a time period varied between 0 and 20 μseconds. As before, the volume of ink contained in a droplet ejected thereby will be between the aforementioned minimum and maximum volumes. Again as before, further modulation of the volume is achievable by raising the voltage applied to one or both of the piezoelectric actuators 56a, 56b above the selected time period.

Figure 4:
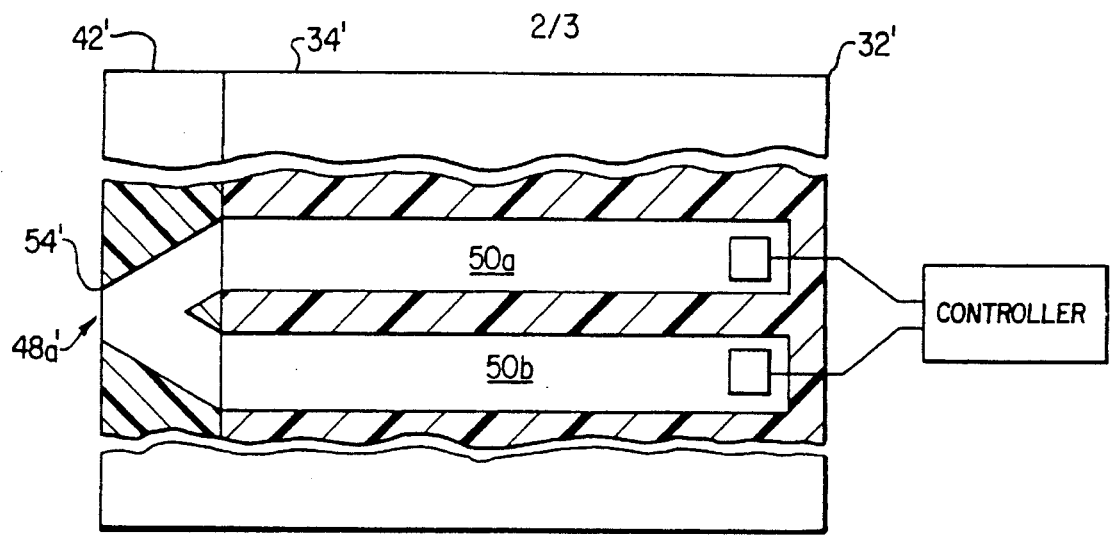
FIG. 4 is an enlarged scale, partial cross-sectional view of an alternate configuration of the ink jet printhead of FIG. 2 in which the pair of ink carrying channels associated with a common orifice are positioned above and below relative to a third opening of the common orifice.

Referring next to FIG. 4, an alternate configuration of the invention previously described with respect to FIG. 3 may now be seen. In FIG. 3, the ink carrying channels 50a and 50b which shared a common orifice 48a for the ejection of ink therefrom were positioned to the left and right, respectively, of the outer opening 54 of the orifice 48a. In this configuration, however, ink carrying channels 50a' and 50b' are formed in the main body portion 34' of the ink jet printhead 32' such that they are positioned above and below, respectively, of the outer opening 54' of the orifice 48a' formed in the cover portion 42'. Apart from this variation in the orientation of the ink carrying channels 50a' and 50b' with respect to the orifice 48a', this configuration of the invention is identical to that described with respect to FIG. 3. Further details regarding the operation of this alternate configuration of the invention are, therefore, not necessary.

Figure 5:
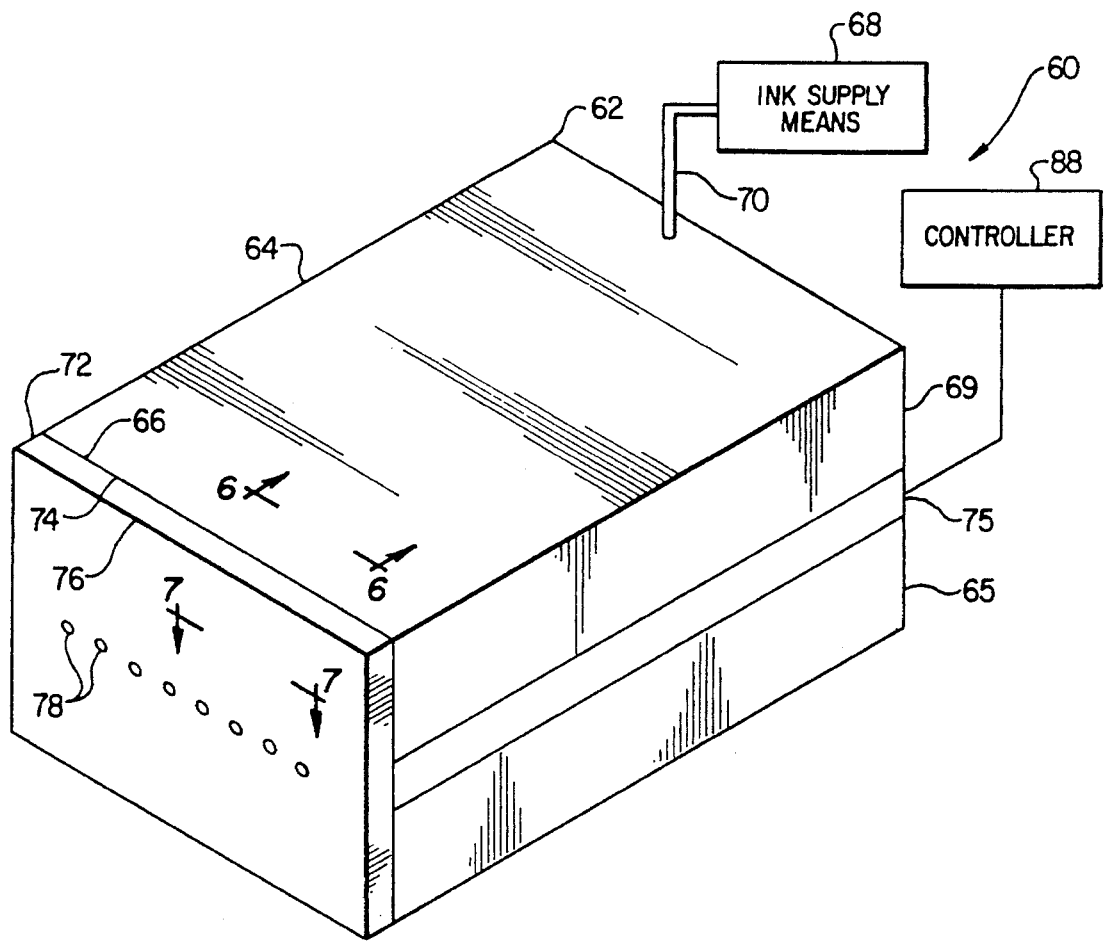
FIG. 5 is a perspective view of yet another alternate embodiment of the ink jet printhead of FIG. 2.

Referring next to FIG. 5, a preferred embodiment of the invention in which the ink carrying channels are provided with active piezoelectric sidewall actuators to generate ink ejecting pressure pulses within the ink carrying channels will now be described in greater detail. As may now be seen, an ink jet printer 60 includes an ink jet printhead 62 having a main body portion 64 constructed such that a plurality of generally parallel ink carrying channels (not visible in FIG. 5) longitudinally extend therethrough. Typically, each of the ink carrying channels extend from a first end located within the main body portion 64 and terminate at an opening along a front side 66 of the main body portion 64. Preferably, the ink carrying channels should be generally parallel to each other along their entire length. As will be more fully described below, the main body portion 62 includes a lower body portion 65 formed from an inactive material such as ceramic, an intermediate body portion 75 formed from an active piezoelectric material and an upper body portion 69 formed from an inactive material. Finally, the ink jet printhead 62 further includes a cover plate 72 having a back side surface 74 fixedly mounted to a front side surface 66 of the ink jet printhead 62, a front side surface 76 and a plurality of tapered orifices 78 extending therethrough. Preferably, the cover plate 72 should be formed of polyamide or another suitable material.

Ink is supplied to the ink-carrying channels from an ink supply means 68 via an external conduit 70. Many methods for supplying ink from the ink supply means 68 to the ink carrying channels are known in the art and, therefore, need not be described in greater detail here. For example, for the ink jet printhead 62, the external conduit 70 delivers the ink to a vertically orientated internal conduit (not shown) which, in turn, supplies the ink to a manifold (also not shown) extending generally normal to the ink carrying channels. As the manifold is in communication with each of the generally parallel ink carrying channels, ink may be drawn into the ink carrying channels from the manifold.

Figure 6:
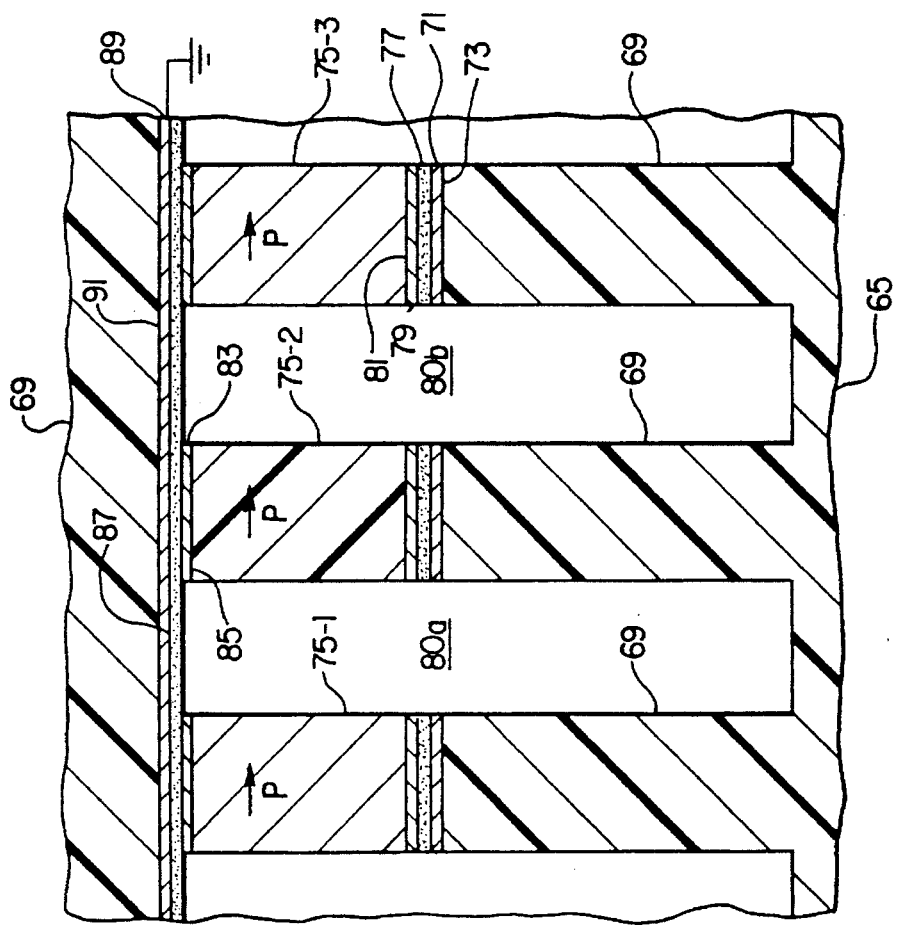
FIG. 6 is an enlarged, partial cross-sectional view taken along lines 6—6 of FIG. 5 and illustrating active piezoelectric sidewall actuators provided for the ink carrying channels of the ink jet printhead.

Referring next to FIG. 6, the configuration of the main body portion 64 will now be described in greater detail. As may now be seen, the lower body portion 65 further includes a series of generally parallel, projecting lower sidewall actuator portions 69 which longitudinally extend along the length of the main body portion 64. Each lower sidewall actuator portion 69 has a layer of conductive material 71 mounted to an upper side surface 73 thereof. A plurality of generally parallel, longitudinally extending, upper sidewall actuator portions 75-1, 75-2, 75-3, all poled in a first direction, and which form the active intermediate body portion 75 illustrated in FIG. 5, are conductively mounted to the lower sidewall actuator portions 69 by a layer of conductive adhesive 77 which conductively mounts the conductive layer 71 to a layer 79 of conductive material affixed to a bottom side surface 81 of the upper sidewall actuator portions 75-1, 75-2, 75-3. Similarly, a layer 83 of conductive material is affixed to upper side surfaces 85 of the upper sidewall actuator portions 75-1, 75-2, 75-3 and a layer of conductive adhesive 87 provided to conductively mount the conductive layer 83 to a layer of conductive material 89 affixed to a lower side surface 91 of the upper body portion 69. Finally, a block of insulative material 93 (see FIG. 7) is used to close each ink carrying channel 80a–d along a rear side thereof. Details regarding the method by which the above-described ink jet printhead 62 is constructed are set forth in copending U.S. patent application Ser. No. 07/746,036, filed Aug. 16, 1991, entitled "Method of Manufacturing a High Density Ink Jet Printhead Array" and hereby incorporated by reference as if reproduced in its entirety.

Figure 7:
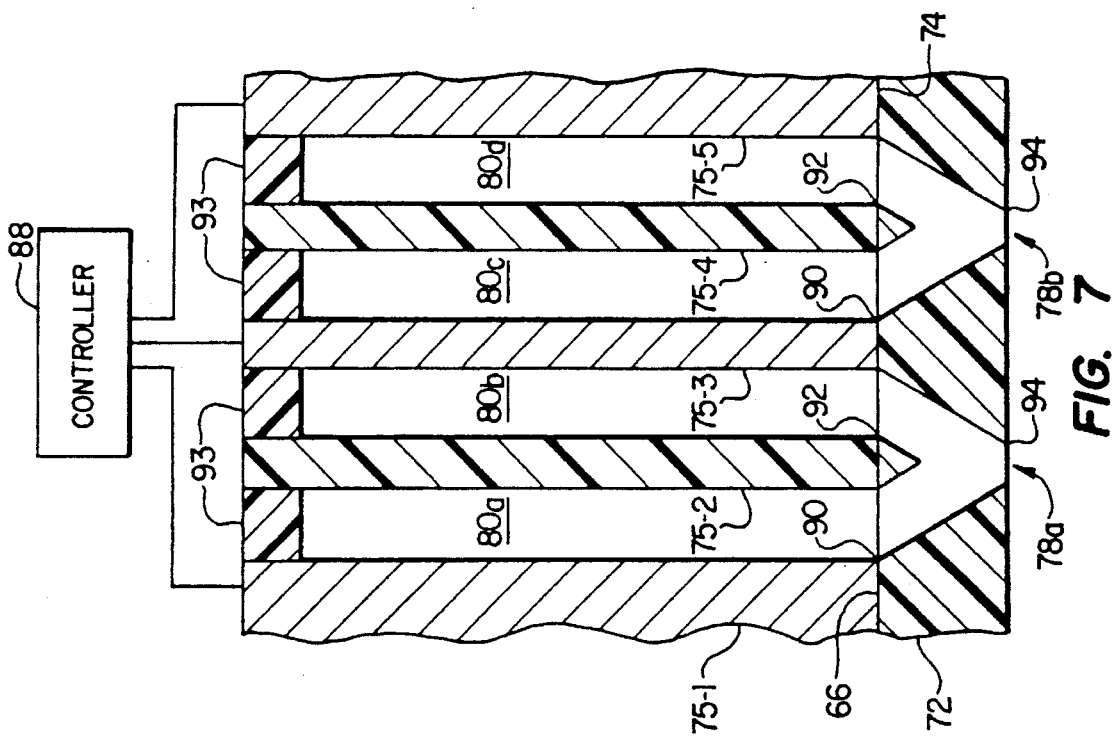
FIG. 7 is a partial cross-sectional view taken along lines 7—7 of FIG. 5 and illustrating the electrical interconnection between the active piezoelectric sidewall actuators of FIG. 6 and a controller for the ink jet printhead.

Referring next to FIGS. 6 and 7, the electrical interconnection between controller 88 and the upper sidewall actuator portions 75-1, 75-2, 75-3, 75-4 and 75-5 will now be described in greater detail. It should be noted that while each upper sidewall actuator portion 75-1 through 75-5 is constructed of an active piezoelectric material and longitudinally extends along the length of the main body portion 64, certain of the upper sidewall actuator portions 75-1 through 75-5 remain unconnected or grounded and are, therefore, represented in the drawing as inactive, rather than as active, portions of the ink jet printhead 62. More specifically, for each pair of ink carrying channels 80a and 80b, 80c and 80d which share a single orifice 78a, 78b, respectively, the upper sidewall actuator portions which border one of each pair of ink carrying channels are electrically connected to the controller 88 while the upper sidewall actuator portions which border both of each pair of ink carrying channels remain unconnected or grounded. For example, in FIG. 7, upper sidewall actuator portions 75-1 and 75-3, both of which partially define ink carrying channels 80a and 80b, respectively, are electrically connected to the controller 88. Upper sidewall actuator portion 75-2, on the other hand, partially defines both ink carrying channels 80a and 80b and is, therefore, shared between the channels 80a and 80b, remains unconnected or grounded. Finally, as further illustrated in FIG. 6, a common path to ground is provide for the upper sidewall actuator portions 75-1 through 75-5 by the connection of the conductive layer 89 to ground.

Continuing to refer to FIG. 7, the tapered orifices 78a, 78b formed in the cover plate 72 and their positioning relative to the ink carrying channels 80a, 80b, 80c, 80d formed in the main body portion 64 of the ink jet printhead 62 may now be seen. Each orifice 48a, 48b has a pair of inner openings 90 and 92 and a single outer opening 94, all of which have approximately the same diameter. The back side surface 74 of the cover plate 72 is aligned, mated and bonded with the front side surface 66 of the main body portion 34 such that each tapered orifice 78a, 78b is in communication with a pair of adjacent ink carrying channels 80a and 80b, 80c and 80d, respectively.

Figure 1:
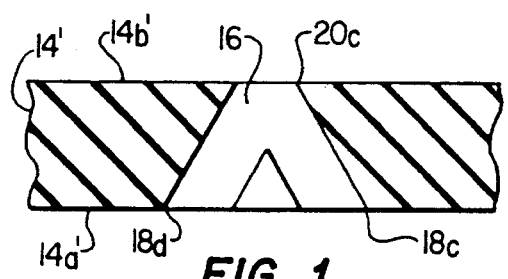
FIG. 1 is an enlarged, cross-sectional view of a cover plate having a tapered orifice formed therein.

As the ink jet printhead 62 illustrated in FIGS. 5–7 differs from the ink jet printhead 32 described and illustrated with respect to FIGS. 1–3 only in that pressure pulses are produced within the ink carrying channels 80a, 80b, 80c, 80d by the upper sidewall portions 75-1, 75-3, 75-3 and 75-5, respectively, further details regarding the ink jet printhead 62 are not necessary for an understanding of the present invention. Further details as to how the controller 88 applies a voltage to the upper sidewall actuator portions 75-1, 75-3 and 75-5 to cause them to deflect into an adjoining ink carrying channel may be found by reference to copending U.S. patent application Ser. No. 07/746,521, now U.S. Pat. No. 5,227,813, which is hereby incorporated by reference as if reproduced in its entirety.

Thus, there has been described and illustrated herein, a multi-channel array actuation system for a drop-on-demand type ink jet printhead capable of modulating the size of spots produced by ink droplets ejected thereby. Those skilled in the art will recognize, however, that numerous modifications and variations may be made in the techniques described herein without departing from the teachings of the present invention.

Accordingly, the foregoing detailed description is to be clearly understood as being given by way of illustration and example only, the spirit and scope of the present invention being limited solely by the appended claims.

What is claimed is:

1. A spot size modulatable, drop-on-demand type ink jet printhead, comprising:

a main body portion having a front side surface and first and second ink carrying channels longitudinally extending therethrough, each said ink carrying channel having an opening along said front side surface of said main body portion;

a cover plate having a front side surface, a back side surface fixedly mounted to said front side surface of said main body portion and a tapered orifice extending therebetween, said orifice having first and second openings along said back side surface and a third opening along said front side surface of said cover plate, said back side surface of said cover plate mounted to said front side surface of said main body portion such that said first opening in said back side surface of said tapered orifice is in communication with said opening of said first ink carrying channel in said front side surface of said main body portion and said second opening in said back side surface of said tapered orifice is in communication with said opening of said second ink carrying channel in said front side surface of said main body portion;

said tapered orifice having first and second interior side surfaces, said first interior side surface having an outward taper which extends from said third opening in said front side surface to said first opening in said back side surface and said second interior side surface having an outward taper which extends from said third opening in said front side surface to said second opening in said back side surface;

first and second piezoelectric actuators coupled with said first and second ink carrying channels, respectively; and means for selectively activating said first and second actuators, respectively, to impart a pressure pulse to said ink carrying channel coupled thereto;

wherein said first ink carrying channel is partially defined by first and second sidewalls and said second ink carrying channel is partially defined by said second sidewall and a third sidewall, said first piezoelectric actuator being formed along said first sidewall, said second piezoelectric actuator being formed along said third sidewall and said second sidewall common to said first and second ink carrying channels being inactive; and wherein said tapered orifice is formed by directing, at first and second angles, respectively, first and second cover plate ablating light beams at a selected location on said front side surface of said cover plate.

2. A spot size modulatable, drop-on-demand type ink jet printhead according to claim 1 wherein each of said first, second and third sidewalls further comprises a lower sidewall actuator portion formed from an inactive material and an upper sidewall actuator portion formed from an active material.

3. A spot size modulatable, drop-on-demand type ink jet printhead according to claim 2 wherein said means for selectively activating said first and second actuators further comprises a controller electrically connected to said upper sidewall actuator portions of said first and third sidewalls, respectively, for selectively applying a voltage thereto and wherein said upper sidewall actuator portion of said second sidewall remains unconnected or grounded.

4. A spot size modulatable, drop-on-demand type ink jet printhead according to claim 1 wherein said back side surface of said cover plate is mounted to said front side surface of said main body portion such that said openings of said first and second ink carrying channels along said front side surface of said main body portion are respectively positioned above and below said third opening along said front side surface of said cover plate and said openings of said first and second ink carrying channels along said front side surface of said main body portion and said third opening along said front side surface of said cover plate are positioned in a single plane.

5. A spot size modulatable, drop-on-demand type ink jet printhead according to claim 1 wherein said back side surface of said cover plate is mounted to said front side surface of said main body portion such that said openings of said first and second ink carrying channels along said front side surface of said main body portion are respectively positioned to the left of and to the right of said third opening along said front side surface of said cover plate and said openings of said first and second ink carrying channels along said front side surface of said main body portion and said third opening along said front side surface of said cover plate are positioned along a single plane.

6. A spot size modulatable, drop-on-demand type ink jet printhead, comprising:

a main body portion having a front side surface and first and second ink carrying channels longitudinally extending therethrough, said first and second ink carrying channels generally parallel with each other along the longitudinal extension thereof and having a first width, each said ink carrying channel having an opening along said front side surface of said main body portion;

said first ink carrying channel partially defined by first and second sidewalls and said second ink carrying channel partially defined by said second sidewall and a third sidewall, each of said first, second and third sidewalls having a lower portion formed of an inactive material and an upper body portion formed of an active piezoelectric material;

a cover plate having a front side surface, a back side surface fixedly mounted to said front side surface of said main body portion and a tapered orifice extending between said front and back side surfaces, said tapered orifice having first and second apertures formed along said back side surface and a third aperture formed along said front side surface of said cover plate, said first, second and third apertures having diameters approximately equal to each other and to said first width;

said back side surface of said cover plate mounted to said front side surface of said main body portion such that said first aperture in said back side surface of said tapered orifice is in communication with, and located in the general center of, said opening of said first ink carrying channel in said front side surface of said main body portion and said second aperture in said back side surface of said tapered orifice is in communication with, and located in the general center of, said opening of said second ink carrying channel in said front side surface of said main body portion;

said tapered orifice having first and second interior side surfaces, said first interior side surface having an outward taper which extends from said third aperture in said front side surface to said first aperture in said back side surface and said second interior side surface having an outward taper which extends from said third aperture in said front side surface to said second aperture in said back side surface;

first and second piezoelectric actuators coupled with said first and second ink carrying channels, respectively, said first piezoelectric actuator being formed along said first sidewall, said second piezoelectric actuator being formed along said third sidewall and said second sidewall common to said first and second ink carrying channels being inactive; and means for selectively activating said first and second actuators, respectively, to impart a pressure pulse to said ink carrying channel coupled thereto, said means for selectively activating said first and second actuators comprising a controller electrically connected to said upper sidewall actuator portions of said first and third sidewalls, respectively, for selectively applying a voltage thereto and wherein said upper sidewall actuator portion of said second sidewall remains unconnected or grounded;

wherein said tapered orifice is formed by directing, at first and second angles, respectively, first and second cover plate ablating light beams at a selected location on said front side surface of said cover plate.

7. A spot size modulatable, drop-on-demand type ink jet printhead according to claim 6 wherein said back side surface of said cover plate is mounted to said front side surface of said main body portion such that said openings of said first and second ink carrying channels along said front side surface of said main body portion are respectively positioned above and below said third aperture along said front side surface of said cover plate and said openings of said first and second ink carrying channels along said front side surface of said main body portion and said third aperture along said front side surface of said cover plate are positioned in a single plane.

8. A spot size modulatable, drop-on-demand type ink jet printhead according to claim 6 wherein said back side surface of said cover plate is mounted to said front side surface of said main body portion such that said openings of said first and second ink carrying channels along said front side surface of said main body portion are respectively positioned to the left of and to the right of said third aperture along said front side surface of said cover plate and said openings of said first and second ink carrying channels along said front side surface of said main body portion and said third opening along said front side surface of said cover plate are positioned in a single plane.

9. A spot size modulatable, drop-on-demand type ink jet printhead, comprising:

a base section formed from an inactive material, said base section having a front side and a plurality of generally parallel spaced projections extending longitudinally from said front side and along said base section, each of said projections having a top side;

a plurality of intermediate sections, each said intermediate section having a front side, a top side and a bottom side conductively mounted on said top side of a corresponding one of said plurality of projections, each of said intermediate sections formed from an active piezoelectric material;

a top section conductively mounted to said top side of each of said plurality of intermediate sections, said top section having a front side and formed from an inactive material;

said base section, said plurality of intermediate sections and said top section defining a plurality of generally parallel, axially extending ink carrying channels, each of said ink carrying channels having an opening for ejection of ink therefrom;

a cover plate having a front side surface, a back side surface fixedly mounted to said front side of said base section, said front side of each one of said plurality of intermediate sections and said front side of said top section, said cover plate having a plurality of tapered orifices extending between said front and back side surfaces, each one of said plurality of tapered orifices having first and second apertures formed along said back side surface of said cover plate and a third aperture formed along said front side surface of said cover plate;

said back side surface of said cover plate mounted to said front side of said base section, said front side of each one of said plurality of intermediate sections and said front side of said top section such that, for each one of said plurality of orifices, said first aperture in said back side surface of said tapered orifice is in communication with said opening of a first one of said plurality of ink carrying channels and said second aperture in said back side surface of said tapered orifice is in communication with said opening of a second one of said plurality of ink carrying channels;

each one of said plurality of tapered orifices having first and second interior side surfaces, said first interior side surface having an outward taper which extends from said third aperture in said front side surface to said first aperture in said back side surface and said second interior side surface having an outward taper which extends from said third aperture in said front side surface to said second aperture in said back side surface; and a controller electrically connected to every other one of said plurality of intermediate sections for selectively applying a voltage thereto, said intermediate sections not connected to said controller remaining unconnected or grounded;

wherein application of a voltage pulse to one of said plurality of intermediate sections deflects said intermediate section into one of said ink carrying channels partially defined thereby to impart a pressure pulse thereto; and wherein size of a spot produced by a droplet of ink ejected from said third aperture of one of said plurality of orifices may be modulated by varying magnitude and duration of a first voltage pulse applied to said intermediate section partially defining a first ink carrying channel in communication with said first aperture of said orifice and connected to said controller and varying magnitude and duration of a second voltage pulse applied to said intermediate section partially defining a second ink carrying channel in communication with said second aperture of said orifice and connected to said controller.

10. A spot size modulatable, drop-on-demand type ink jet printhead according to claim 9 wherein said first, second and third apertures have diameters approximately equal to each other and to said first width.

11. A spot size modulatable, drop-on-demand type ink jet printhead according to claim 10 wherein said plurality of tapered orifices are formed by directing, at first and second angles, respectively, first and second cover plate ablating light beams at a plurality of selected location on said front side surface of said cover plate.

12. A spot size modulatable, drop-on-demand type ink jet printhead according to claim 11 wherein, for each one of said plurality of orifices, said first aperture in said back side surface of said tapered orifice is located in the general center said opening of said first one of said plurality of ink carrying channels and said second aperture in said back side surface of said tapered orifice is located in the general center of said opening of said second one of said plurality of ink carrying channels.

13. A spot size modulatable, drop-on-demand type ink jet printhead according to claim 12 wherein said back side surface of said cover plate is mounted to said front side of said base section, said front side of each one of said plurality of intermediate sections and said front side of said top section such that, for each one of said plurality of orifices, said openings of said first and second ink carrying channels in communication with said orifice are respectively positioned above and below said third aperture of said orifice and said openings of said first and second ink carrying channels in communication with said orifice and said third aperture of said orifice are positioned in a single plane.

14. A spot size modulatable, drop-on-demand type ink jet printhead according to claim 12 wherein said back side surface of said cover plate is mounted to said front side surface of said base section, said front side of each one of said plurality of intermediate sections and said front side of said top section such that, for each one of said plurality of orifices, said openings of said first and second ink carrying channels in communication with said orifice are respectively positioned to the left of and to the right of said third aperture of said orifice and said openings of said first and second ink carrying channels in communication with said orifice and said third opening of said orifice are positioned in a single plane.

* * * * *